R. P. SMALL.
TRIP HOOK.
APPLICATION FILED MAR. 17, 1919.
1,333,511.
Patented Mar. 9, 1920.
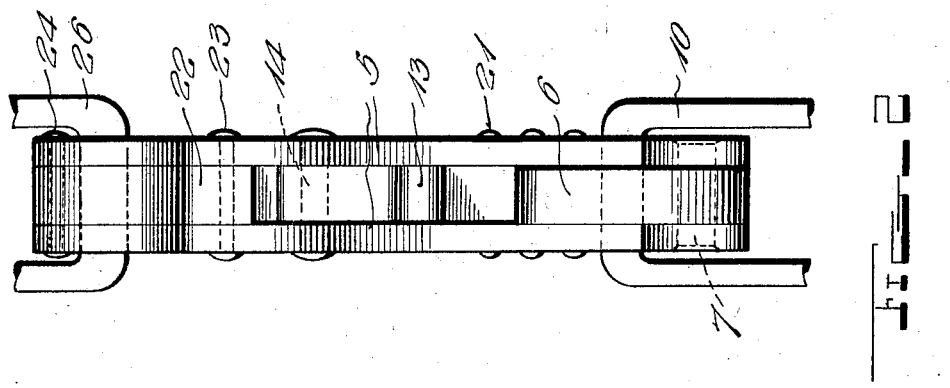
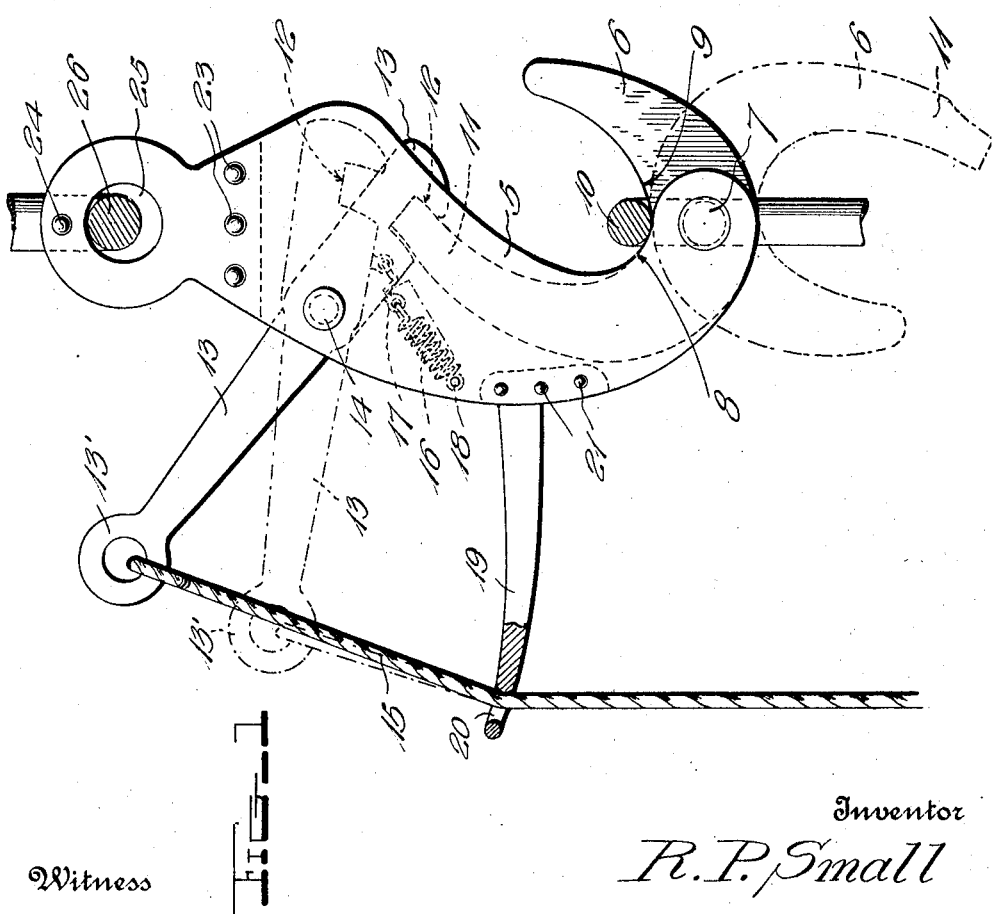
Witness
Inventor
R. P. Small
By H. R. Wilson &co.
Attorneys

UNITED STATES PATENT OFFICE.

RAY P. SMALL, OF SAN DIEGO, CALIFORNIA.

TRIP-HOOK.

1,333,511.   Specification of Letters Patent.   Patented Mar. 9, 1920.

Application filed March 17, 1919. Serial No. 283,131.

*To all whom it may concern:*

Be it known that I, RAY P. SMALL, a citizen of the United States, residing at San Diego, in the county of San Diego and State of California, have invented certain new and useful Improvements in Trip-Hooks; and I do declare the following to be a full, clear, and exact description of the invention, such as will enable others skilled in the art to which it appertains to make and use the same.

This invention relates to hooks, and it relates more specifically to an improved trip hook for hoisting, aerial transporting and similar operations.

One object of this invention is to simplify and generally improve upon devices of this character by providing an arrangement of simple, strong and accurately designed parts.

Another object of the invention is to provide a device of this character which can be operated with the maximum ease and despatch.

Other objects and advantages will become apparent to persons who read the following details of description in connection with the accompanying drawings in which:

Figure 1 is a side elevation of my improved trip hook.

Fig. 2 is a front edge view of the device shown in Fig. 1.

Referring to these drawings in detail, in which similar reference characters correspond with similar parts throughout the several views, the invention consists broadly in forming a hook of two hook members 5 and 6. pivotally connected together at 7 and having their bearing surfaces or load supporting portions directly above the pivot 7, so that the main hook member 5 relieves the pivot 7 of the greater part of the weight supported by the hook, and so that the subsidiary hook member 6 receives only a sufficient portion of the weight to cause it to automatically release the weight when the subsidiary hook member is itself released by means described hereinafter. In order to effect these results, the lower end portion of the main hook member has its load-bearing surface 8 inclined downward and outward toward its lower end, and the lower bearing surface 9 of the subsidiary hook-member is downwardly and inwardly inclined and meets the bearing surface 8 at a point directly over the axial center of the pivot 7. It will be seen, therefore, that when a load is applied to the hook, as through the medium of a link 10, the said link has contact with the main and subsidiary members at their junction directly above the axial center of the pivot 7, and both the pivot and the subsidiary hook member are relieved of at least fifty per cent. of the weight held by the link 10.

In order that the subsidiary hook member may be held in its normal working position, as shown in full lines, the same is made substantially U-shaped, as shown in dotted lines in Fig. 1, the longer arm 11 of this U-shaped member being disposed between the two side plates which constitute the main hook member 5, as shown in Fig. 2, and the upper end of this member is normally engaged by a notch 12 of a lever 13 which is pivotally connected to the main hook member 5 by means of a pivot 14. The notched arm of the lever 13 extends between the plates of the main hook member, and the other arm of this lever extends backward from between the plates and is provided with an eye 13′ which may be engaged with a cord or cable 15 which is operatable to swing the lever 13 into its dotted line position so as to release the subsidiary hook member. In order that the lever 13 may securely hold the subsidiary hook member in its effective position, a retractile spring 16 has one end secured to the lever at 17, and its other end is secured to the main hook member at 18, it being understood that this spring is located between the plates of the main hook member.

For the purpose of guiding the cord or cable 15 and preventing it from becoming entangled with the subsidiary hook member 6 or with the load carried by the hook, an arm 19 has one end provided with an eye 20 through which the flexible element 15 extends, and the other end of the arm 19 is secured between the plates of the main hook member by means of rivets or bolts 21. The inner end of the arm 19 is broadened and extended laterally of the main portion of the arm 19 so as to provide a secure anchorage for this arm and to provide a simple effective means for limiting the movement of the subsidiary hook member to its operative position, that is, into the position in which its longer arm is engageable with the notch 12 of the tripping lever 13, and its shorter arm is in such position relative to the main hook member, that these members 5 and 6 form a substantially C-shaped hook. This facilitates the operation of the device and also protects the spring 16 from being struck by the arm 11 when it is swung into its effective position.

An apertured spacing block 22 is disposed between the upper ends of the plates 5, said upper ends being provided with apertures to correspond and register with those of the spacing member 22, and rivets or bolts 23 and 24 extend through the smaller apertures of the plates and spacing member and unite them rigidly with one another. An eye 25 is formed by registering apertures through the spacing block and plates 5, and a supporting member 26 engages with the eye 25 and may be connected with any means, (not shown) for coöperating with my improved hook in supporting, hoisting and conveying loads.

Although I have described this embodiment of my invention very specifically, it is not intended to limit this invention to these exact details of construction and arrangement of parts, but I am entitled to make changes within the scope of the inventive idea disclosed in the foregoing description and following claim.

What I claim as my invention is:

A trip hook comprising two plates spaced from one another and united to form a main hook member having a pivot-bearing at its lower end and having a downwardly and outwardly inclined bearing surface extending over said pivot-bearing, a pivot in said pivot bearing, a substantially U-shaped subsidiary hook-member mounted on said pivot and having one of its arms movable in the space between the plates of the main hook-member, the other arm of the U-shaped hook-member having a bearing surface which normally inclines downward toward said main hook-member and meets the latter at a point above said pivot, a detaining and releasing lever pivotally mounted between said plates and having a notch to engage with the first said arm of the subsidiary hook-member, a spring in the space between said plates and connected thereto and to said lever and being effective to yieldingly hold said lever in position to engage with and hold said subsidiary hook-member in its normal or effective position, and an arm having an eye in one end to guide a rope which may be connected to the lever for causing it to release the subsidiary hook member, said arm having its other end secured between said plates in a position to stop the subsidiary hook member in position to be engaged by the notch of said lever.

In testimony whereof I have hereunto set my hand.

RAY P. SMALL.